United States Patent [19]
Hirzel

[11] Patent Number: 5,949,157
[45] Date of Patent: Sep. 7, 1999

[54] MOTOR DRIVEN SWITCH

[75] Inventor: Edgar A. Hirzel, Granada Hills, Calif.

[73] Assignee: Baton Labs, Inc., Granada Hills, Calif.

[21] Appl. No.: 08/927,250

[22] Filed: Sep. 11, 1997

[51] Int. Cl.⁶ ................................................. H01H 35/00
[52] U.S. Cl. ............................ 307/116; 307/112; 307/125
[58] Field of Search .......................... 307/10.1, 98, 112, 307/116, 125, 139; 318/9, 10, 65, 256, 280, 671

[56] References Cited

U.S. PATENT DOCUMENTS

| | | |
|---|---|---|
| 2,709,725 | 5/1955 | Bieber et al. . |
| 2,864,912 | 12/1958 | Schmidt . |
| 2,870,288 | 1/1959 | Schmidt . |
| 3,127,518 | 3/1964 | Pruitt . |
| 3,171,920 | 3/1965 | Klein et al. . |
| 3,172,400 | 3/1965 | Hale . |
| 3,395,288 | 7/1968 | Von Brimer . |
| 3,462,647 | 8/1969 | Russell . |
| 3,474,296 | 10/1969 | Rickey . |
| 3,497,707 | 2/1970 | Stewart . |
| 3,646,354 | 2/1972 | Von Brimer . |
| 3,668,514 | 6/1972 | Peck . |
| 3,763,415 | 10/1973 | Ownby . |
| 3,829,753 | 8/1974 | Marshall . |
| 3,852,732 | 12/1974 | Yorksie et al. . |
| 3,967,133 | 6/1976 | Bokern . |
| 4,017,724 | 4/1977 | Finger . |
| 4,052,717 | 10/1977 | Arnold et al. . |
| 4,088,940 | 5/1978 | Ciarniello et al. . |
| 4,090,122 | 5/1978 | Hoinski . |
| 4,127,782 | 11/1978 | Omura et al. . |
| 4,137,557 | 1/1979 | Ciamiello et al. . |
| 4,149,093 | 4/1979 | D'Alessio et al. . |
| 4,153,869 | 5/1979 | Ragaly . |
| 4,161,684 | 7/1979 | Ragaly . |
| 4,180,770 | 12/1979 | Eby . |
| 4,193,026 | 3/1980 | Finger et al. . |
| 4,258,305 | 3/1981 | Anglin . |
| 4,259,625 | 3/1981 | Hatakeyama et al. . |
| 4,282,475 | 8/1981 | Milton . |
| 4,357,505 | 11/1982 | Bridges . |
| 4,365,188 | 12/1982 | Walter . |
| 4,388,618 | 6/1983 | Finger . |
| 4,444,067 | 4/1984 | Preuss et al. . |
| 4,445,090 | 4/1984 | Melocik et al. . |
| 4,493,001 | 1/1985 | Sheldrake . |
| 4,509,005 | 4/1985 | Stroud . |
| 4,516,066 | 5/1985 | Nowakowski . |
| 4,733,100 | 3/1988 | Nusairat et al. . |
| 4,782,240 | 11/1988 | Davidson . |
| 4,832,146 | 5/1989 | Luby . |
| 4,902,956 | 2/1990 | Sloan . |
| 4,990,873 | 2/1991 | Grunert et al. . |
| 5,089,762 | 2/1992 | Sloan . |
| 5,200,877 | 4/1993 | Betton et al. . |
| 5,296,788 | 3/1994 | Betton et al. . |
| 5,296,997 | 3/1994 | Betton et al. . |
| 5,640,072 | 6/1997 | Miyazaki et al. ........................ 318/282 |

*Primary Examiner*—Jeffrey Gaffin
*Assistant Examiner*—Peter Zura
*Attorney, Agent, or Firm*—Brinks Hofer Gilson & Lione

[57] ABSTRACT

An improved motor driven switch is provided. A control system employs the improved motor-driven switch in series with a battery to disconnect the battery from a load when the energy level of the battery drops to a predetermined level. The system comprises an overdrive circuit to ensure that the motor drives a gear train to sufficiently close a gap between a movable switch plate and contact plates in a switch-closed position to reduce switch contact resistance.

48 Claims, 11 Drawing Sheets

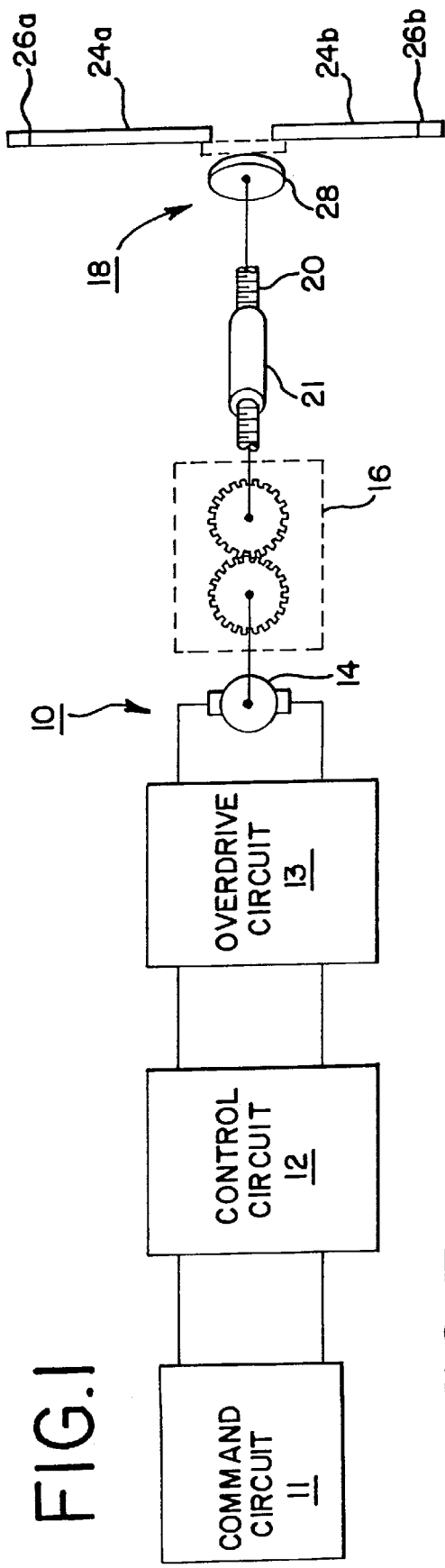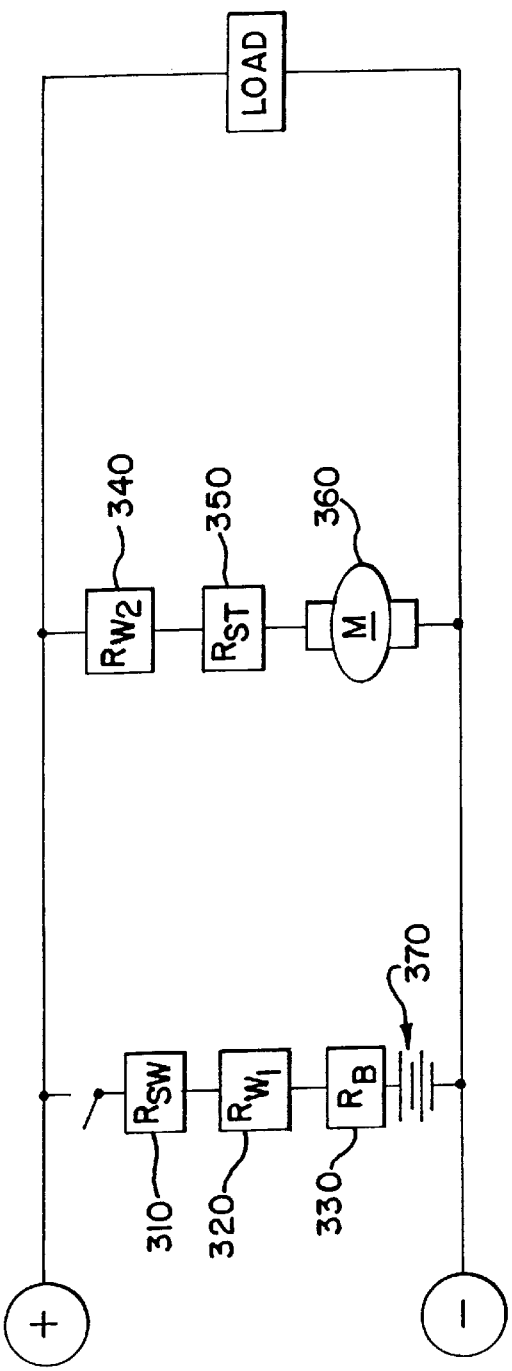

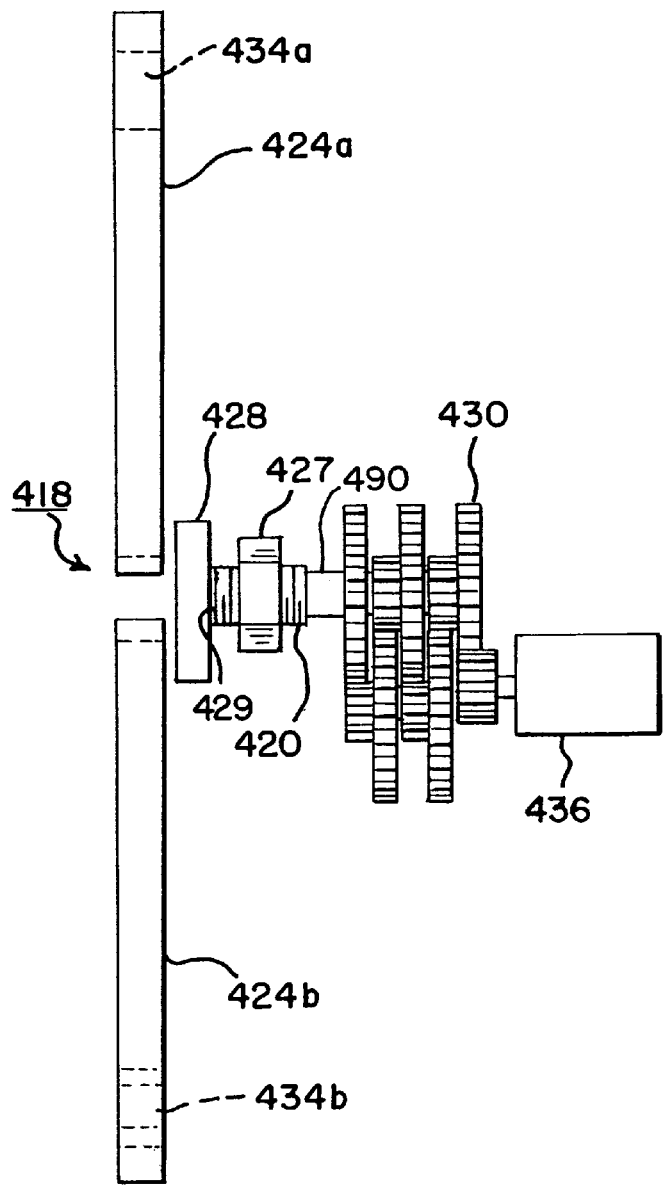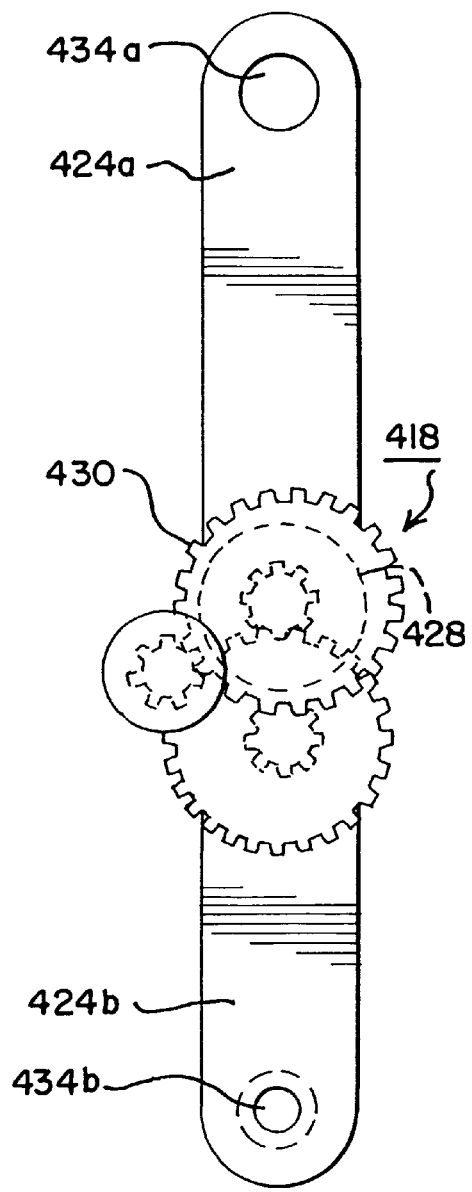

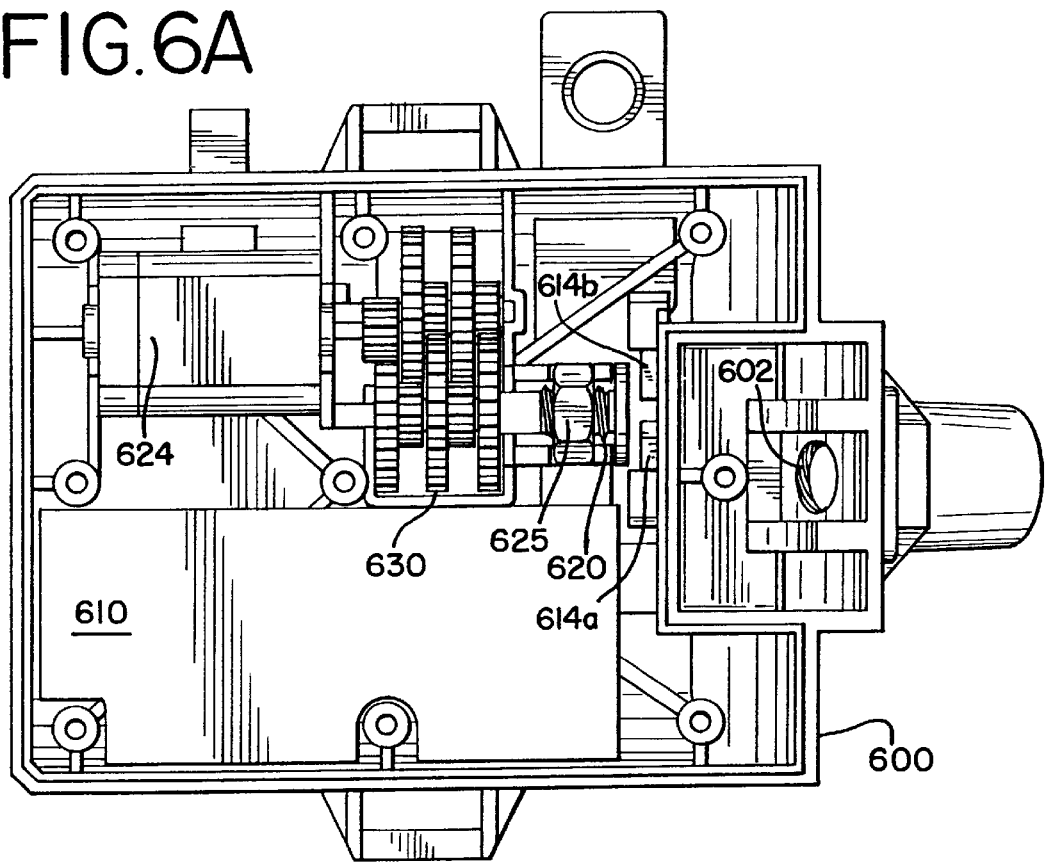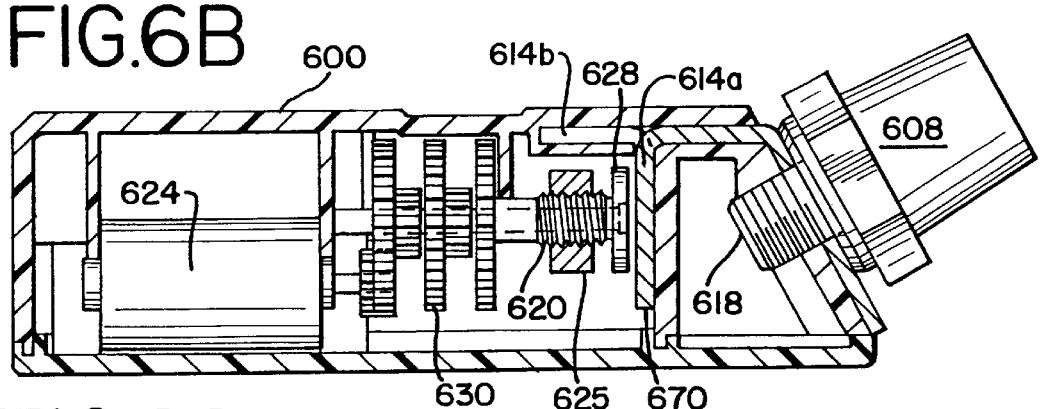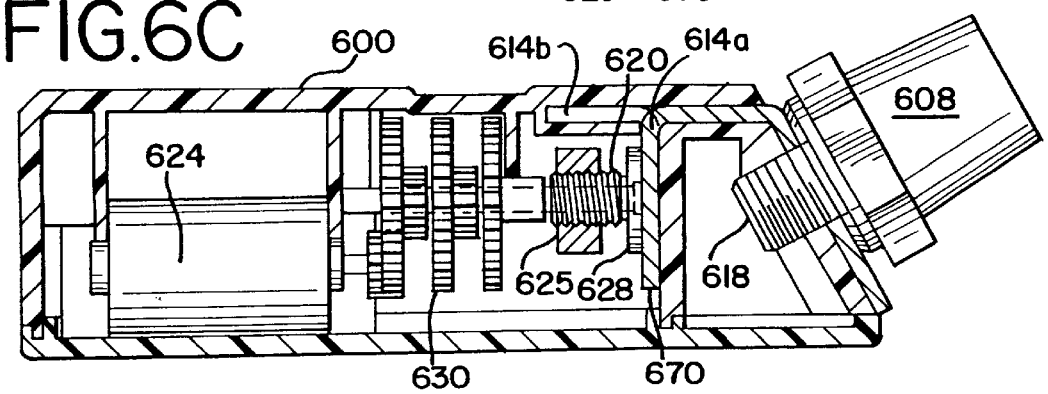

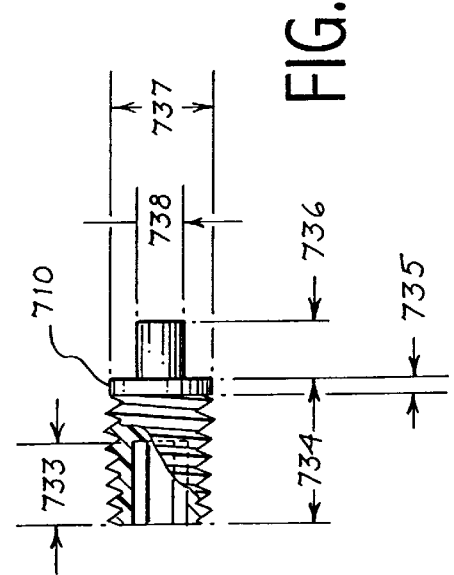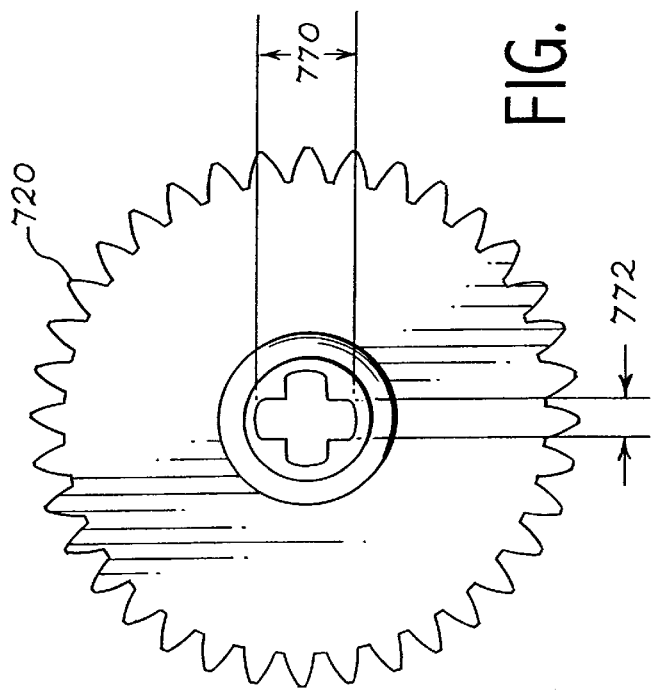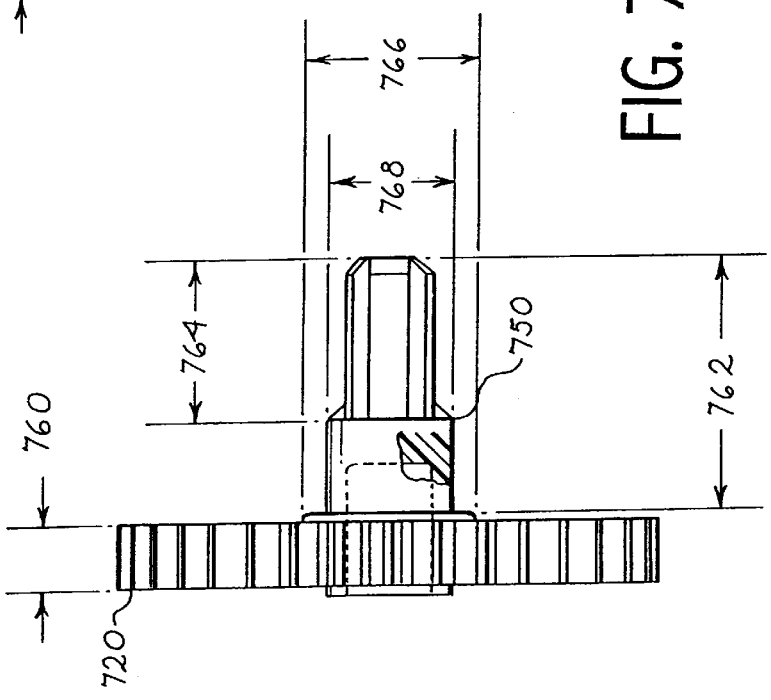

5,949,157

MOTOR DRIVEN SWITCH

FIELD OF THE INVENTION

The present invention relates as indicated to a switch, and more particularly to a switch that, in the switch-closed position, has improved electrical conductance and reduced electrical resistance across the opposed switch contacts. The switch of the invention is suited especially for use in the circuit of storage batteries, such as batteries employed in the starter circuits for the engines of automobiles, trucks, recreational vehicles, marine motors, and similar circuits.

BACKGROUND OF THE INVENTION

In the past, battery protection devices have been proposed for storage batteries employed in starter circuits of engines. The proposed battery protection devices are directed to solving the frequently occurring problem that arises, for example, when a vehicle operator inadvertently leaves his or her vehicle headlights burning after the engine is stopped, so that the battery is discharged to such a low point that it no longer can start the engine. Such proposed devices are described in U.S. Pat. Nos. 5,200,877; 5,296,788; and 5,296,997, each of which is hereby incorporated by reference.

The basic concept of such battery protection devices is to employ a motor-driven switch in series with the battery that disconnects the battery from the load (for example, headlights) when the energy level of the battery drops to a predetermined level. While the concept of such battery protection devices is sound, implementing the broad concept encounters problems due to high switch contact resistance in the switch-closed position.

In the switch-closed position, high switch contact resistance interferes with the starting of the engine. To start the engine, an engine-starting system containing a battery for powering the starter motor is used. The battery-powered starter motor cranks the engine up to starting speed while overcoming the starting torque of the engine; in so doing, high amounts of current, for example, 500–800 amperes, may be required. Therefore, the cranking speed of the starter motor is highly responsive to the electrical resistance in series with the battery: the internal battery resistance, the electrical resistance of the battery cables, the electrical resistance of connections, as well as the electrical resistance of any switch connected between the battery and starter motor.

For example, if the electrical resistance of such a switch is 15 milli-ohms, and the starter motor requires 600 amperes to achieve cranking speed, the voltage drop across the switch is nine volts, thus reducing the voltage across the starter-motor using a 12-volt battery to less than three volts, the other resistance in the starter circuit causing an additional voltage drop. Measurements made of the electrical resistance across the contact of the switches of prior battery protection devices revealed resistance values as high as 15 to 20 milli-ohms. As shown above, such high levels of electrical resistance could interfere with starting the engine, especially at cold temperatures.

One attempt to solve the above-described problem is to use the polar moment of inertia of a high speed miniature motor, as described in the '877 and '997 patents. Typical motor drive circuitry is arranged to disconnect the electrical drive from the motor immediately upon opening or closing of the contacts using an intrinsic motor limit switch feature. Using the polar moment of inertia can provide a one-half additional revolution after drive power has been removed from the motor to provide greater contact or contact clearance. While this technique provides firm, efficient contact closure and opening, improvements are needed to reduce electrical resistance of the switch contacts.

SUMMARY OF THE INVENTION

It is, therefore, an object of the present invention to provide a switch in which the electrical resistance across the opposing switch contacts in switch-closed position is minimized.

It is another object of the invention to provide a switch for use in a battery protection system.

It is still another object of the invention to provide a switch for use in series with a battery in which said switch is provided with a system for reducing the electrical resistance across the switch contacts in switch-closed position to no more than approximately the electrical resistance of the battery cables.

It is yet another object of the invention to improve the separation of the switch contacts in switch-open position.

The features and advantages of the invention will be further understood upon consideration of the following detailed description of the presently preferred embodiments of the invention taken in connection with the appended drawings.

BRIEF DESCRIPTION OF THE DRAWINGS

FIG. 1 is a diagrammatic illustration of an improved motor driven switch system made according to the invention.

FIG. 3 is a diagram illustrating a circuit for a starting system containing a battery and starter motor for cranking an engine.

FIG. 4A is a side view of a gear train showing contact plates and compound gears.

FIG. 4B is a top view of the gear train showing contact plates and compound gears.

FIG. 6A is a bottom view of one presently preferred motor driven switch housing for use with the motor driven switch system shown in FIG. 1.

FIG. 6B is a side view of the housing shown in FIG. 6A illustrating a switch plate in open-circuit relation with the contact plates.

FIG. 6C is a second side view of the housing shown in FIG. 6A illustrating a switch plate completing an electrical connection between the contact plates.

FIG. 7A is a plan view of a preferred jack screw used to move a contact plate of a preferred embodiment.

FIG. 7B is a side view of a preferred jack screw used to move a contact plate of a preferred embodiment.

FIG. 7C is a side view of a preferred spindle driver gear that is connected to a jack screw in a preferred embodiment.

FIG. 7D is a plan view of a preferred spindle driver gear that is connected to a jack screw in a preferred embodiment.

DETAILED DESCRIPTION OF THE PRESENTLY PREFERRED EMBODIMENTS

Figure 2:
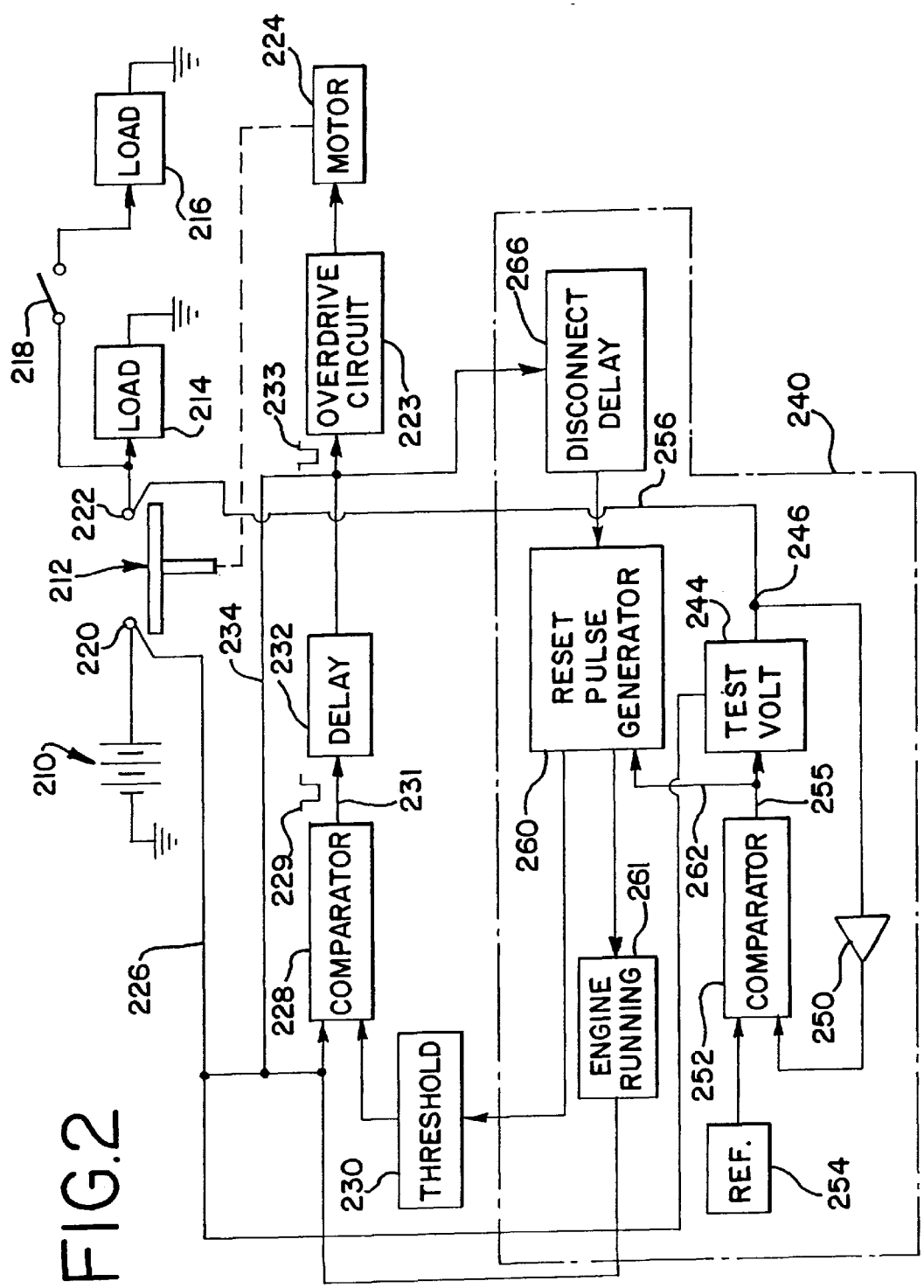
FIG. 2 is a block diagram of a system employing the principles of the present invention.

Briefly, the present invention in one preferred embodiment employs an overdrive circuit in an electro-mechanical system for opening and closing switch contacts for an added distance, or an increased time, beyond the first open and first closed position of the switch. As used herein, "first open position" is the position of the switch when electrical contact is first broken and "first closed position" is the position of the switch when electrical contact is first made. In switch open position, the overdrive circuit drives the switch from the first open position to a second open position. In the second open position, the gap between switch contacts is larger than in the first open position. In switch closed position, the overdrive circuit provides additional movement, or an increased closing time, after the initial closing to move the switch from the first closed position to a second closed position. In the second closed position, the overdrive circuit increases the forces between the switch contacts, thereby reducing the electrical resistance across said contacts. In switch closed position the added movement, or increased closing time, between the switch contacts caused by the overdrive circuit is barely perceptible, but results in a desired reduction in electrical resistance.

By electro-mechanical device is meant any suitable arrangement of electric motors, solenoids, armatures, or other electrically powered devices for driving the switch contacts open or closed. The electro-mechanical device may employ various mechanisms for providing a mechanical advantage to the electrically powered device, such as, screws, gear trains, worm gears, compound gears, levers, and the like. In one specially preferred embodiment, the electro-mechanical device also includes a command circuit, a control circuit, as well as the overdrive circuit mentioned above. By command circuit is meant any electrical circuit that responds to a first condition for generating a first signal, or responds to a second condition for generating a second signal, or responds to both said first and second conditions for generating first and second signals. By control circuit is meant any electrical circuit that is able to operate a drive mechanism in response to the first and/or second signal from a command circuit. By overdrive circuit is meant an electrical circuit which provides time delay after a first open and/or a first closed position to move a switch to a second open and second closed position, respectively.

The electro-mechanical system having the overdrive circuit preferably is connected to a drive mechanism for opening and closing the switch contacts. By drive mechanism is meant the member or members connected to the output of the electro-mechanical device for mechanically operating the switch contacts between switch open and switch closed positions. The drive mechanism may include shafts, rods, jack screws, toggles, links, and the like, which are directly, or indirectly, connected to the switch contacts. The drive mechanism is constructed and arranged to transmit the forces generated by the electro-mechanical system, for example, an electro-mechanical systems containing a motor and a gear train, to the switch contacts.

Referring now to the drawings, FIG. 1 shows one presently preferred embodiment of a motor driven switch system 10. As illustrated in FIG. 1, the motor driven switch system 10 includes a command circuit 11, a control circuit 12, and an overdrive circuit 13 coupled to a motor 14. The command circuit 11 is responsive to a first condition for generating a first signal, is responsive to a second condition for generating a second signal and includes a timer for generating a timer output signal. The control circuit 12 is used to drive the motor 14 in either a clockwise or counterclockwise direction in response to the first or second signal from command circuit 11. For example, a high voltage signal from the command circuit 11 will cause the control circuit 12 to drive the motor 14 in one direction, and a low voltage signal from command circuit 11 will cause the control circuit 12 to drive the motor 14 in the opposite direction.

The motor 14 is configured to drive a gear train 16 that operates a switch 18. The switch 18 includes a threaded shaft 20 that cooperates with a threaded stationary member 21. The threaded shaft 20 can be a jack screw, and the stationary member 21 can be a threaded nut or part of the housing for the motorized switch. The shaft 20 supports a movable switch plate 28, so that when the shaft 20 is rotated in one direction, the movable switch plate 28 is moved to close the gap between the contact plates 24a, 24b, as shown by the dotted lines. When rotated in the opposite direction, the shaft 20 moves the plate 28 away from contacts 24a, 24b to open the switch 18 as shown in full lines. The contact plates 24a, 24b are coupled to an external high-current circuit, preferably via cables 26a, 26b.

The overdrive circuit 13 ensures that the motor 14 drives the gear train 16 to sufficiently close the gap between the movable switch plate 28 and the contact plates 24a, 24b in a switch-close position to reduce switch contact resistance. The operation of the overdrive circuit 13 will be discussed in more detail below.

FIG. 2 is a block diagram of a system employing the principles of the present invention. As shown in FIG. 2, a vehicle battery 210 is connected through a normally closed main switch 212 to an unswitched load 214 and to a switched load 216, which is under control of an ignition switch 218. The unswitched load 214 may include, for example, headlights, radio, and the like. The switched load 216 may be, for example, the starter motor and starter solenoid. The standard vehicle electrical system connects the battery 210 to loads 214, 216 directly without interposition of the main switch 212. To apply the system of the present invention in a conventional vehicle electrical system, it is only necessary to connect the main switch 212 between one battery terminal, such as the positive terminal, and the loads.

The switch 212 connects or disconnects the terminals 220, 222 according to the switch condition as determined by a motor 224 and an overdrive circuit 223. With the switch 212 in a closed position, the terminals 220, 222 are connected to one another, and the battery 210 is thus connected to the loads 214, 216. When the switch 212 is driven to the open position, the terminals 220, 222 are disconnected and the loads 214, 216 are disconnected from the battery 210.

Battery voltage at the positive switch terminal 220 is sensed through line 226 and is connected as a first input to a comparator 228. A second input to the comparator 228 is provided from a reference or threshold voltage generator 230. The comparator 228 provides a low output 229 or first signal on line 231 when the sensed battery voltage or first condition at terminal 220 falls below the threshold determined by the threshold voltage generator 230.

The comparator output 229 is connected through a delay circuit or timer 232, which provides a fault signal 233 to the motor 224 and overdrive circuit 223, to open the main switch 212 after the sensed voltage has remained below the threshold for the delay period. Generation of the fault signal 233 will occur if the voltage drops below the threshold for the duration of the delay period regardless of the size of the load causing the condition. The comparator output 229 is thus a function of time alone and is independent of the size of the voltage drop below the threshold.

Delay Circuit 232

In normal operation when the vehicle is started by engaging the ignition switch 218, the sensed voltage on line 226 will drop as the starter solenoid and starter motor (not shown) draw current from the battery 210. This sensed voltage drop would normally cause the main switch 212 to open. However, the delay circuit 232, which initiates its delay interval when the low battery output 229 occurs, is interposed between the comparator 228 and the switch 212 to inhibit delivery of the fault pulse 233 for the delay period. If the fault signal 233 was not delayed, operation of the starter would result in a drop in voltage at the battery 210, and the low battery voltage signal 229 would be provided at the output of comparison circuit 228.

A delay period of fifty-five to sixty seconds should be long enough to cover the time normally required to start the vehicle by operation of the ignition switch 218. Thus, a sensed voltage drop due to normal starting operation will not inadvertently open the main switch 212. The output of the comparator 228 appearing on line 231 will rise to disable the delay circuit 232 prior to the end of the delay period. Accordingly, the delay circuit will not time out, and the disconnect signal will not be transmitted to the motor 224 and overdrive circuit 223. On completion of the starting operation, the starter motor is disconnected so the battery voltage will return to its normally higher level.

Should the low voltage sensed on line 226 result from a drain on the battery 210 so that the battery voltage remains in a lowered condition for longer than the delay period, the delay circuit 232 will time out and provide the fault signal 233 to the motor 224 and overdrive circuit 223. This operation causes the main switch 212 to open and disconnect the loads 214, 216 from the battery 210. When the loads 214, 216 are disconnected, there is no further drain on the battery 210.

Upon disconnection, voltage across the terminals 220, 222 will begin to increase and within several minutes will attain the open circuit voltage of the battery 210. The open circuit voltage, however, may be above the threshold voltage of circuit 230. Thus, this increase in voltage may cause the output 229 of the comparator 228 to rise and result in reapplication of the loads. In order to prevent such cyclical operation, a hysteresis feedback signal is provided on line 234 to the voltage sensing input of the comparator 228 to maintain the input at a value below the threshold. This feedback prevents closing the main switch 212 and thus avoids repetitive off and on cycling.

Reset Circuit 240

System reset circuitry 240 is preferably provided to continuously test the disconnected load and sense a change in load caused by an attempted restart of the vehicle. A test voltage generator 244 is connected across the main switch 212 and is supplied with power from the positive terminal 220. The test voltage generator 244 employs a closed loop, negative feedback arrangement to establish a small test voltage at its output on line 246. A preferred value for such test voltage is about 3 milli-volts.

The closed loop arrangement maintains a relatively stable voltage on line 246 over a wide range of loads. The voltage on line 246 is connected through an amplifier 250 to a comparison circuit 252. The comparison circuit 252 compares the amplified voltage on line 246 to a reference voltage established by a reference circuit 254. The difference between the feedback voltage on line 246 and the reference voltage appears as an output on line 255 from the comparison circuit 252. The output on line 255 serves as an input to the test voltage generator 244 to vary the value of the voltage generated by minimizing changes in the voltage on line 246. This negative feedback stabilizes the test voltage at a small value over a wide range of loads.

The test voltage on line 246 is applied to both loads 214, 216 through line 256 and through terminal 222 of the main switch 212. This small voltage is applied to the loads 214, 216 while they are disconnected from the battery 210 and after the main switch 212 has been opened due to an inadvertent battery drain.

Operation of the ignition to start the vehicle will close the ignition switch 218 and will connect the starter solenoid (load 216) momentarily in parallel with the small cold resistance of load 214. Closing the ignition switch 218, therefore, causes a very small change in resistance across load 214, which changes the voltage seen on line 246. This change in voltage causes an output or second condition to appear on line 255 from comparison circuit 252. This output or second condition is coupled through line 262 to a reset pulse generator 260. The reset pulse generator 260 provides a reset or second signal to the threshold circuit 230. The reset or second signal operates to lower the threshold voltage at the second input of comparator 228 and, as a result, resets the delay circuit 232, thus removing the fault pulse. Removal of the fault pulse causes drive circuitry in the motor 224 to close the disconnected main switch 212.

Operation of the ignition switch 218 is sensed by the reset circuit 240, which engages the motor 224 to substantially immediately close the main switch 212. The closing of the switch 212 is preferably accomplished in less than one second. The operation is such that the vehicle driver is not aware of any delay or difference in operation and is able to start the vehicle in a normal manner.

Disconnect Delay Circuit 266

When a low battery voltage has been detected and has remained in excess of the delay period, the switch 212 is opened, and the voltage at terminal 222 begins to decay rapidly. The reset circuit 240 would normally sense this drop in voltage and generate a reset pulse to immediately close the switch 212. If this were allowed to happen, the system would repetitively cycle on and off. To avoid such recycling, the reset pulse generator 260 must be inhibited for a selected period of time (on the order of several seconds) by means of a disconnect delay circuit 266 triggered by the occurrence of the fault signal 233. Thus, the reset circuit 240 is effectively isolated from the threshold circuit 230 for a short period of time after the main switch 212 is opened.

After the main switch 212 has remained open for several seconds, the voltage at terminal 222 becomes relatively stable, and the reset pulse generator 260 is again allowed to operate until the ignition switch is reengaged. Thereafter, a valid reset pulse closes the switch 212 and allows current from the battery 210 to be supplied to the starter solenoid (load 216).

Engine Running Circuit 261

The protection circuitry discussed so far will operate whenever the battery 210 voltage falls below the predetermined threshold, whether this occurs while the vehicle is parked or while the engine is running. However, for most applications it is not desirable to disconnect the loads 214, 216 from the battery 210 while the engine is running. If the battery voltage should drop below the threshold while the engine is running, the main switch 212 will open. If the alternator is not operating to provide electrical power during such occurrence, the vehicle engine would simply stop. Accordingly, an engine running signal is preferably provided by means of an engine running circuit 261, which raises the sensed battery signal and prevents generation of the fault signal.

The engine running circuit 261 operates by sensing a ripple or slight variation in current through the load due to either alternator or ignition operation and raises the sensed battery signal at the input to comparator 228. The ripple from the alternator or ignition is amplified through a high gain amplifier consisting of a series of operational amplifiers. The high gain amplifier magnifies this ripple into approximately a 212-volt square wave. The square wave is then connected to a pulse pump circuit that serves to maintain a voltage above the threshold level at the input to the comparator 228.

Overdrive Circuit 223

When the portion of the electro-mechanical device described above causes the switch plate in first contact with the contact plates, a first closed position, the electrical resistance across the switch is typically greater than 10 milli-ohms, a first electrical resistance. The overdrive circuit 223 causes the motor 14 to drive the gear train 16 to assert a greater force between the switch plate and the contact plates in a second closed position, thereby reducing the electrical resistance across the switch to a second electrical resistance less than said first electrical resistance.

The primary requirement of an automobile battery is starting the engine. The current and voltage required varies with engine/starter cranking ratio, circuit resistance, temperature, and accessory load. Since the cranking speed of a DC motor of the starter is directly proportional to the voltage and the cranking torque is proportional to the current, a very significant parameter is circuit resistance. High circuit resistance can, therefore, interfere with the starting of the engine.

As shown in FIG. 3, circuit resistance comprises the switch contact resistance 310, a first wire resistance 320, a battery resistance 330, a second wire resistance 340, and a starter motor resistance 350. The battery resistance 330 is intrinsic to the battery 370. The battery 370 is usually predefined as original equipment. For example, the "Battery Replacement Data Book" by Battery Council International specifies that a BCI Group Number 75 battery for a 1989 Oldsmobile Cutlass delivers between about 430 and 630 cold cranking amperes when installed in a typical starting circuit, such as the one shown in FIG. 3. The battery resistance 330 can be determined from test data, such as that shown in M. Barak, "Electromechanical Power Sources," page 251. As given in this reference, a 12.6 (no-load) volt, 100 Ah (20h) SLI battery at 77° F. has an 11.2 discharge voltage and a 208 discharge amperage. Thus, the battery resistance 330 in this example would be (12.6 v–11.2 v)/208 amp or 6.7 milli-ohms. As another example, with an initial 327 ampere discharge and 10.5 volt discharge, the battery resistance 330 is 6.4 milli-ohms. These examples indicate that the internal battery resistance 330 of a 100 Ah SLI battery is approximately 6 milli-ohms at 77° F. At 0° F., the internal battery resistance 330 would be about 10 milli-ohms.

A starter motor 360 is typically rated in terms of kilo-Watts. For example, a starter motor 360 requiring 450 amperes would be rated at 2.2 kW (see Robert Bosch, "Automotive Electric/Electronic Systems," page 73 (1988)). The starter motor resistance 350 can be calculated from the power and current at stall; that is, before any rotation-induced EMF. Since $R=P/I^2$, in this example, $R=2,200/202$, 500 or 10.8 milli-ohms. Thus at 0° F., if the starter motor resistance 350 is 11 milli-ohms, the internal battery resistance 330 is 10 milli-ohms, and the combined cable or wire resistances 320 and 340 are 1 milli-ohm, then the peak current available to start cranking the engine would be 12.5 v/22 milli-ohms, or 568 amperes. Any additional system resistance will reduce the power available to crank the engine. For example, the addition of 1 milli-ohm of system resistance will result in about a 5% reduction in current or an $I^2R$ or 10% loss in power. Five milli-ohms of additional resistance will result in only about 65% of the specified starter motor power and an over 100 ampere reduction in available cold cranking amperes.

As another example, consider the situation in which a current of about 500 amperes is needed for the starter 360 to start the engine. Such a situation is typical in cold weather conditions or where the engine is a diesel engine. To provide the starter 360 with 500 amperes of current, the total circuit resistance (i.e., the switch contact resistance 310, the first wire resistance 320, the battery resistance 330, the second wire resistance 340, and the starter motor resistance 350) cannot be greater than 24 milli-ohms [12v/500 amperes]. Typically, the battery resistance 330 is at least about 8 milli-ohms. The battery resistance 330 of an old battery 370 at subzero temperatures can be about 12 milli-ohms. With such a battery 370, about half of the battery potential is lost in the battery resistance 330 itself, leaving only about 6 volts for the remainder of the starting system. In other words, the cranking speed is reduced by one half. Every additional milli-ohm of resistance that exists in the circuit reduces the voltage to the starter 360 by 0.5 volts (1 milli-ohm*500 amperes) or 8.3%. Although the starter solenoid contact resistance and terminal and cable lug resistance contribute to the resistance of the circuit, wire losses 310, 340 contribute a significant amount of resistance.

A typical starter circuit uses about four feet of #6 AWG copper wire. Per the Handbook of Chemistry and Physics, the resistance of such wire is characterized as 395.1 milli-ohms per 1000 feet. With such a resistance characteristic, four feet of #6 wire adds 1.2 milli-ohms to the circuit loss.

Because the battery internal resistance 330, the starter motor resistance 350, and the wire resistances 320, 340 are original vehicle design parameters, it is preferred that the switch contact resistance 310 be designed as small as possible in the switch-closed position in order to meet the requirements of minimum loss or reduction in cold cranking amperes. Specifically, it is most desired that the switch contact resistance 310 be less than about the total wire resistance (i.e., the first 320 and second 340 wire resistances in FIG. 3). It is preferred that the switch contact resistance 310 be less than about 8 milli-ohms. It is specially preferred that the switch contact resistance 310 be less than about 5 milli-ohms, and it is desired that the switch contact resistance 310 be less than about 2 milli-ohms.

To achieve lower switch contact resistance 310, the overdrive circuit 13 increases the contact force of the switch plate 28 against the contacts 24a, 24b (see FIG. 1). Consider the situation in which a switch contact resistance 310 of less than about 1.2 milli-ohms is desired. As mentioned above, a typical starter circuit uses about four feet of #6 AWG copper wire. The resistance of the cross section of such a wire is equivalent to the resistance of #11 AWG copper wire with a cross-section of 0.006467 square inches. The switch plate 28 preferably is a lead-tin plated annulus 0.5 inches OD and 0.16 inches ID with an "apparent area" of 0.176 square inches. This is not the true contact area or "real area." The "real area" is found by dividing the contact force by the compressive modulus of the material. In like manner, the required force may be calculated by multiplying the desired "real area" by the modulus. To achieve a 1.2 milli-ohm switch contact resistance 310 across the switch plate 28, it is desired that 0.006467 square inches be the "real area of contact." In reference to the Handbook of Chemistry and Physics, a conservative value of 10,000 lbs/square inch can be chosen for the elastic modulus for the lead-tin plating on the switch plate 28. This yields a product of about 62 lbs of linear contact force. Therefore, to achieve an acceptable switch resistance in this example, the contact force must be at least about 62 lbs.

In order to achieve the required contact force, a motor and compound gear and jack screw system can be used, as shown in FIGS. 4A and 4B. As illustrated in FIGS. 4A and 4B, the motor driven switch system 418 includes a pair of bus bars or contact plates 424a, 424b, which are employed to connect to the external high-current circuit. Also shown in FIG. 4A is the motor 436 employed to open and close the switch 418. Attached to the shaft of the motor 436 are compound gears 430. The motor 436 is operable thus to drive the compound gears 430 in either clockwise or counterclockwise directions.

A threaded shaft 420 (i.e., a jack screw) cooperates with a threaded nut 427 and is mechanically coupled to a spindle driver gear 490 of the compound gear system 430. The threaded shaft 420 supports a movable switch plate 428 and a spring washer 429. The movable switch plate 428 makes and breaks the electrical connection between the contact plates 424a, 424b. The spring washer 429 has a self-aligning characteristic that equalizes the forces between the movable switch plate 428 and the contact plates 424a, 424b. Thus, as the compound gears 430 are driven in a first direction by the motor 436, the threaded shaft 420 also rotates in a first direction thereby opening the physical connection between the switch plate 428 and the contact plates 424a, 424b. When the compound gears 430 are driven in a second direction by the motor 436, the threaded shaft 420 rotates in a second direction opposite from the first direction and closes the physical gap between the contact plates 424a, 424b and the movable switch plate 428.

Also shown in FIGS. 4A and 4B, mounting holes 434a, 434b are provided at the outer ends of the contact plates 424a, 424b. The mounting holes 434a, 434b are employed to couple the motor driven switch system 418 to a high-current electrical system. In the preferred embodiment, the mounting holes 434a, 434b are employed to couple the motor driven switch system 418 to an automobile electrical system (not shown).

The switch plate 428 is preferably made from 360 brass with a tin plate finish. The plate 428 is preferably 0.094 inches thick with a 0.5 inch OD. The ID is preferably 0.125 inches for 0.094 inches of the thickness. The ID for the remainder of the thickness of the plate 428 preferably slopes from 0.150 inches to 0.175 inches along a 0.0005 inch gradation. (These dimensions include the tin plate finish.) The contact plates 424a, 424b are preferably 0.080 inch-thick copper with tin plating. A ground wire comprising 0.032 inch-thick copper with tin plating can also be added to this switching system.

The compound gear system 430 driven by the motor 436 is preferably a five-stage 3:1 gear train with a total gear ratio of 3 to the 5th power or 243:1. This total gear ratio equates to 85.05 oz. in. or 7.09 in. lb. of torque at the threaded shaft. It is preferred that the compound gears be comprised of Celcon M90 natural-color plastic from Hoechst-Celanese.

FIGS. 7A and 7B are plan and side views, respectively, of a preferred jack screw 710 used to move the contact plate in switch open and switch closed positions. FIGS. 7C and 7D are side and plan views, respectively, of a preferred spindle driver gear 720 that is connected to a jack screw in a preferred embodiment. As can be seen in these figures, the jack screw has a cross-design female connector that couples to a cross-design male connector in the preferred spindle driver. The cross-design, as compared to a blade design, can better withstand the forces that are generated when the overdrive circuit establishes a lower contact resistance across the switch. That is, a cross-design is less susceptible to twisting and other distortions. Additional support is preferably provided by a fillet radius 750. Additionally, it is preferred that the jack screw and nut have a 0.25 inch diameter with 20 threads per inch. The preferred dimensions of the preferred jack screw 710 and spindle driver gear 720 are shown in Table 1 below.

TABLE 1

| Reference Number | Dimension |
| --- | --- |
| 730 | 0.150 inches |
| 732 | 0.066 inches |
| 733 | 0.22 inches |
| 734 | 0.38 inches |
| 735 | 0.40 inches |
| 736 | 0.150 inches |
| 737 | 0.250 inches |
| 738 | 0.120 inches |
| 760 | 0.100 inches |
| 762 | 0.370 inches |
| 764 | 0.200 inches |
| 766 | 0.250 inches |
| 768 | 0.188 inches |
| 770 | 0.144 inches |
| 772 | 0.060 inches |

While a jack screw and compound gears are preferred, it is important to note that other drive mechanisms can be used. For example, worm gears or planetary gears may be used instead of compound gears.

It is preferred that the spring washer 429 be a stainless steel Belville spring washer. Such a washer is available from Seastrom Manufacturing Company as part number 301-304. Preferably, the spring washer 429 is secured to the jack screw 420 by melting the plastic of the jack screw 420 onto the spring washer 429. Because the spring allows the washer to float in the switch open position, vibrations may cause the switch to close, providing a signal to reset the system. To reduce vibration sensitivity, the overdrive circuit preferably increases the gap between the contact plates 424a, 424b and the switch plate 428 by one full turn of the jack screw 420. If a jack screw is used with the preferred configuration described above, the gap would be increased by about fifty-thousandths of an inch.

The motor 436 shown in FIG. 4A is preferably a miniature DC 12-volt motor with a typical stall torque of 0.45 oz. in. As those skilled in the art will appreciate, the motor 436 can comprise other machines employing electromotive force. Due to the bridge drive circuit described below, the actual terminal voltage is about 10 volts, limiting the actual stall torque to about 0.35 oz. in. It is preferred that motor model number FK-130SH/RH from Mabuchi Motor Co., Ltd. be used.

The axial force (contact force) may be calculated as follows. $F=(T_g-T_f)*2*\pi*r/r*p$, where F is the axial force, $T_g$ is the gear train output torque, $T_f$ is the friction torque, r is the thread radius, p is pitch, and $\pi$ is 3.14159.

Simplifying, F=(Tg−Tf)*k, where k is 2πt/p, where Tf equals mu*F*r and mu is the friction coefficient. So, F=(Tg−F*mu*r)*k or (F+F*mu*r*k)=Tg*k. With the preferred 0.25 inch diameter, 20 threads-per-inch threaded shaft, p is 0.05, r is 0.125, and mu is 0.5. Therefore, F=7.09*125.6/8.85 or 100.62 lbs. Accordingly, the design criteria of the above example (axial force above at least 62 lbs.) is met to maintain an acceptable switch contact resistance 310. It is important to note that the above is merely an example and that other designs can be used to generate other desired axial forces to reduce switch contact resistance 310 to a desired level.

Figure 5:
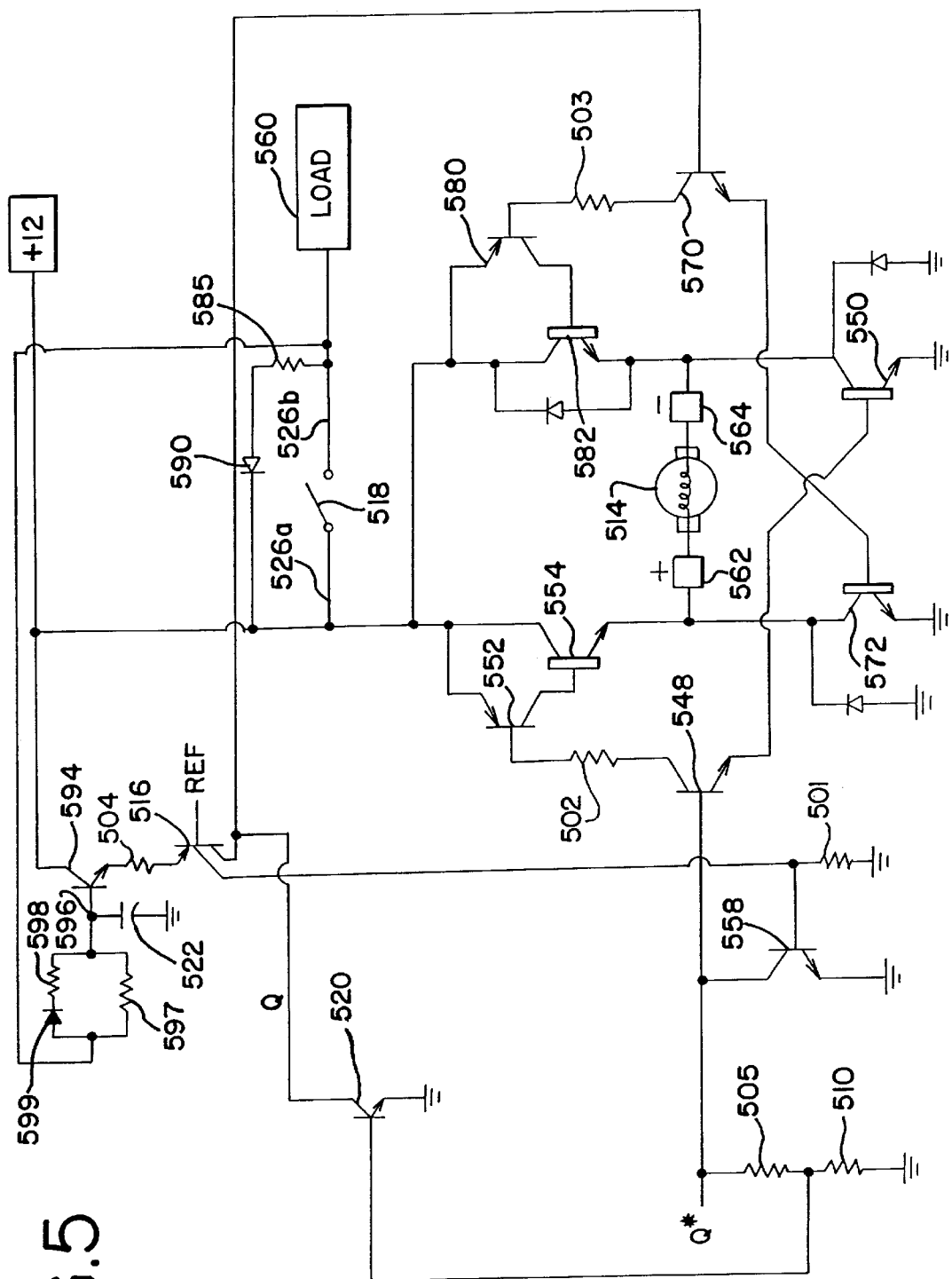
FIG. 5 illustrates an embodiment of the preferred control circuitry for operating an improved motor driven switch.

For the DC motor 436 to achieve the necessary stall torque, the overdrive circuit 13 is used to continue to send a motor drive command to the motor 436 until it stalls. To accomplish this, the circuit shown in FIG. 5 can be implemented. FIG. 5 is a modification of FIG. 3B of the '788 patent, which, as mentioned above, is incorporated by reference. FIGS. 3A and 3B of the '788 patent illustrate circuitry used for a motor driven switch. FIG. 5 of the present patent shows the modifications needed for the overdrive circuit.

As shown in FIG. 5, the npn transistor 594 and the dual collector pnp transistor 516 are connected such that when chip terminal 596 is high, the npn transistor 594 and the dual collector pnp transistor 516 conduct, and when chip terminal 596 is low, the transistors are off. The state of chip terminal 596 and inputs Q and Q* then determine whether the bridge circuit made up of transistors 554, 550 or 582, 572 conduct to cause the DC motor 514 to either close or open the switch 518 connecting contacts 526a and 526b.

Note that signals Q and Q* are mutually exclusive. That is, if Q* is HIGH, then Q is forced to LOW. Q* is set HIGH on the command to close the motor driven contacts. Thus, Q* HIGH will try to turn on transistor 548 and transistors 552, 554, and 550 conducting current from terminal 562 through the motor 514 to terminal 564, if transistor 558 is not conducting. Therefore, the motor 514 rotates to close the power switch 518. When the power switch 518 first closes, the load voltage goes high and the capacitor 522 connected to chip terminal 596 starts to charge through the diode 599 and resistor 598. As shown in FIG. 5, resistor 598 and diode 599 are in parallel with resistor 597 from the load 560. Resistor 598 and diode 599 permit charging current to the chip circuit to provide the discharge path.

After the resulting RC time established by the capacitor 522 and resistors, chip terminal 596 is high, the npn transistor 594 and the dual collector pnp transistor 516 conduct, which turns on transistor 558. This connects Q* to ground stopping motor 514 rotation. Thus, this circuit functions to allow the DC motor 514 to run for an additional length of time given by the RC charge after closure of the switch contacts 518. Preferably, the additional length of time is in the range of about 0.6 seconds to about 0.9 seconds and is preferably about 0.75 seconds. This delay before stopping rotation allows the system to take full advantage of the motor stall torque forcing the contacts 518 together, yielding a much lower switch contact resistance.

As the consequence of a disconnect command from the circuit, Q* goes LOW and Q is HIGH. Prior to a disconnect command, the motor driven contacts are closed and the capacitor 522 connected to the chip circuit 596 is HIGH. Therefore transistor 594 and 516 are conducting, and transistor 520 stops conducting, allowing current to turn on transistors 570, 580, 582, and 572. This action reverses the current through motor 514 disconnecting the switch 518.

The capacitor 522, however, is allowed to discharge slowly through resistor 597. This forces the motor 514 to continue to rotate in the disconnect mode even after the contacts have opened. The amount of additional opening (which allows for additional contact air gap) is controlled by the discharge time constant of chip circuit 596 and resistor 597.

It is preferred that resistors 501, 502, 503, 504, 505, 510, 585, 597, and 598 be about 15 kilo-ohms, 6 kilo-ohms, 3 kilo-ohms, 7.5 kilo-ohms, 10.5 kilo-ohms, 10.5 kilo-ohms, 390 ohms, 1 mega-ohm, and 75 kilo-ohms, respectively. It is also preferred that capacitor 522 be a 10 micro-Farad capacitor, diode 590 be a 6-volt Zener diode, and diode 599 be a 1N914 diode. As those skilled in the art will appreciate, the control circuit illustrated in FIG. 5 can be used to control external circuits of varying power requirements.

Figure 8:
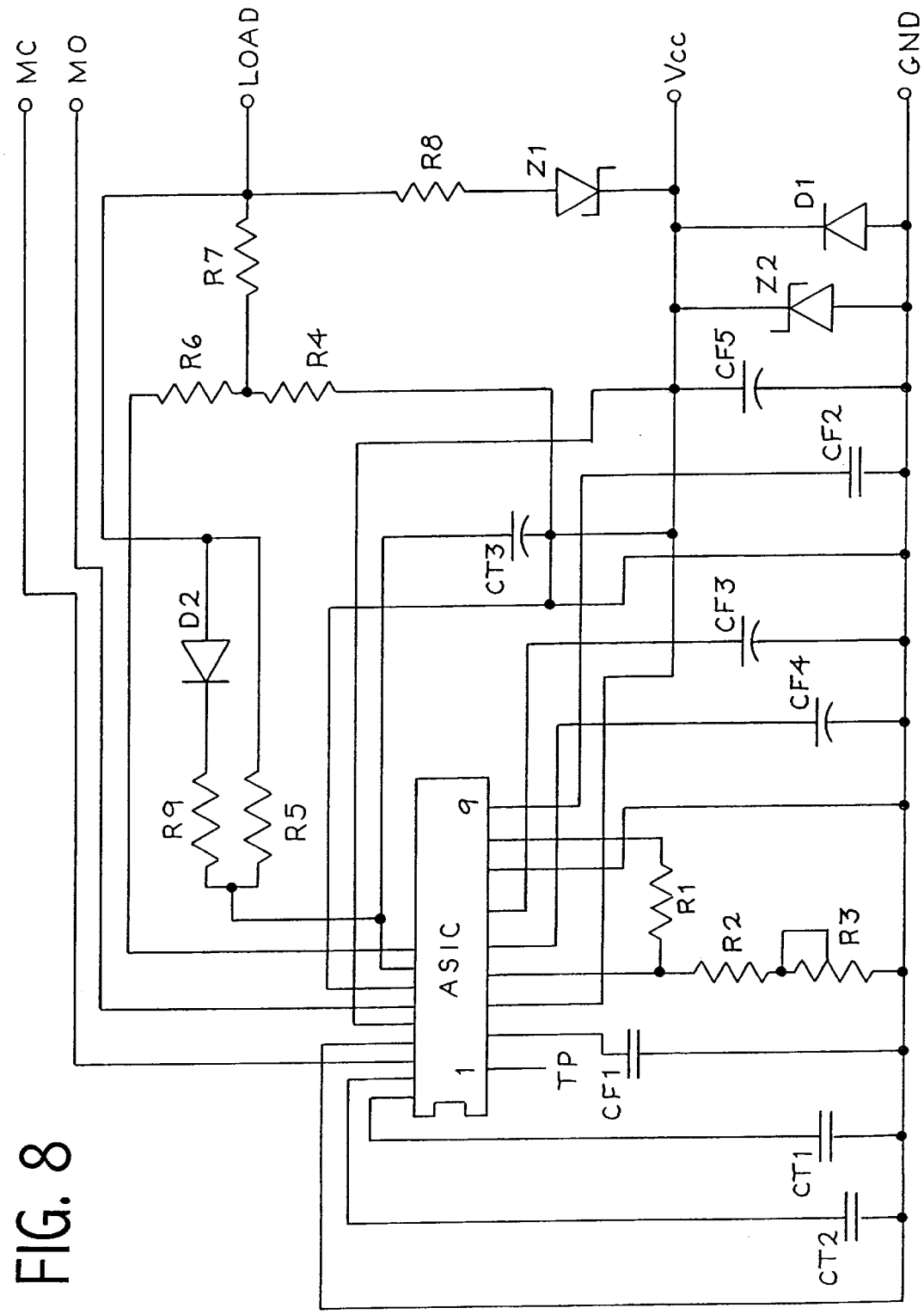
FIGS. 8, 9A, 9B, 10A and 10B are circuit diagrams for control circuitry for operating an improved motor driven switch of a preferred embodiment.
Figure 9A:
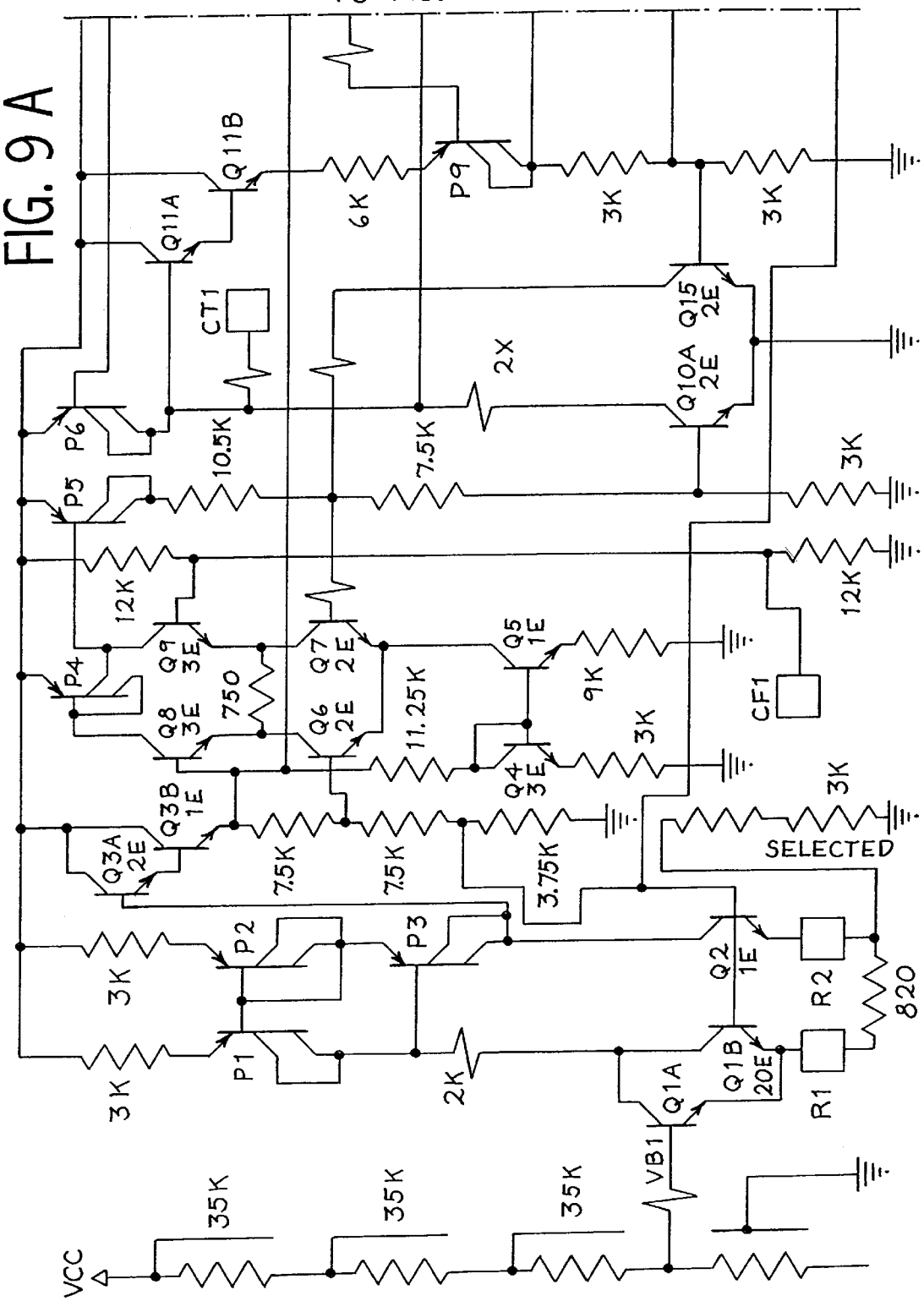
Figure 9B:
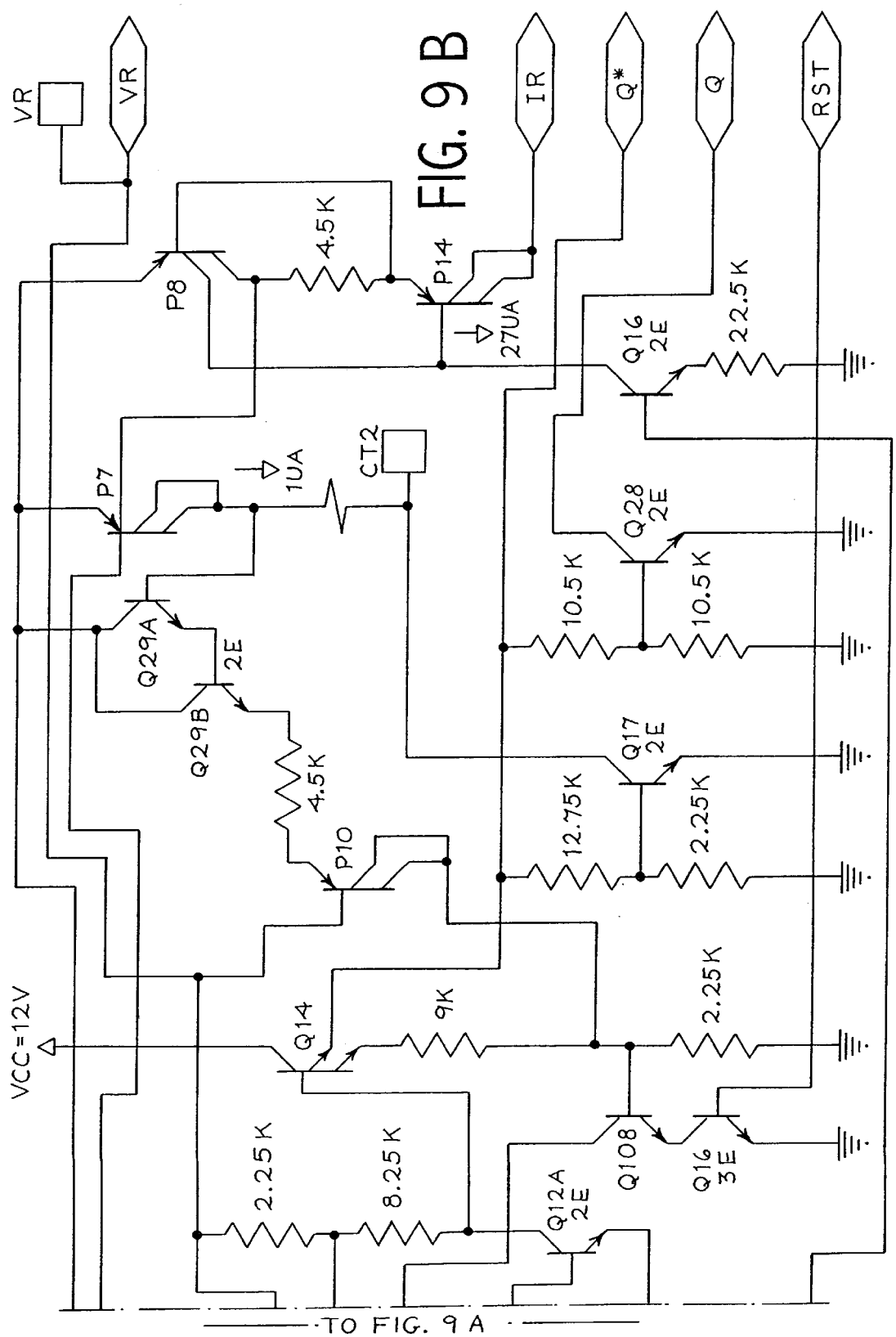
Figure 10:
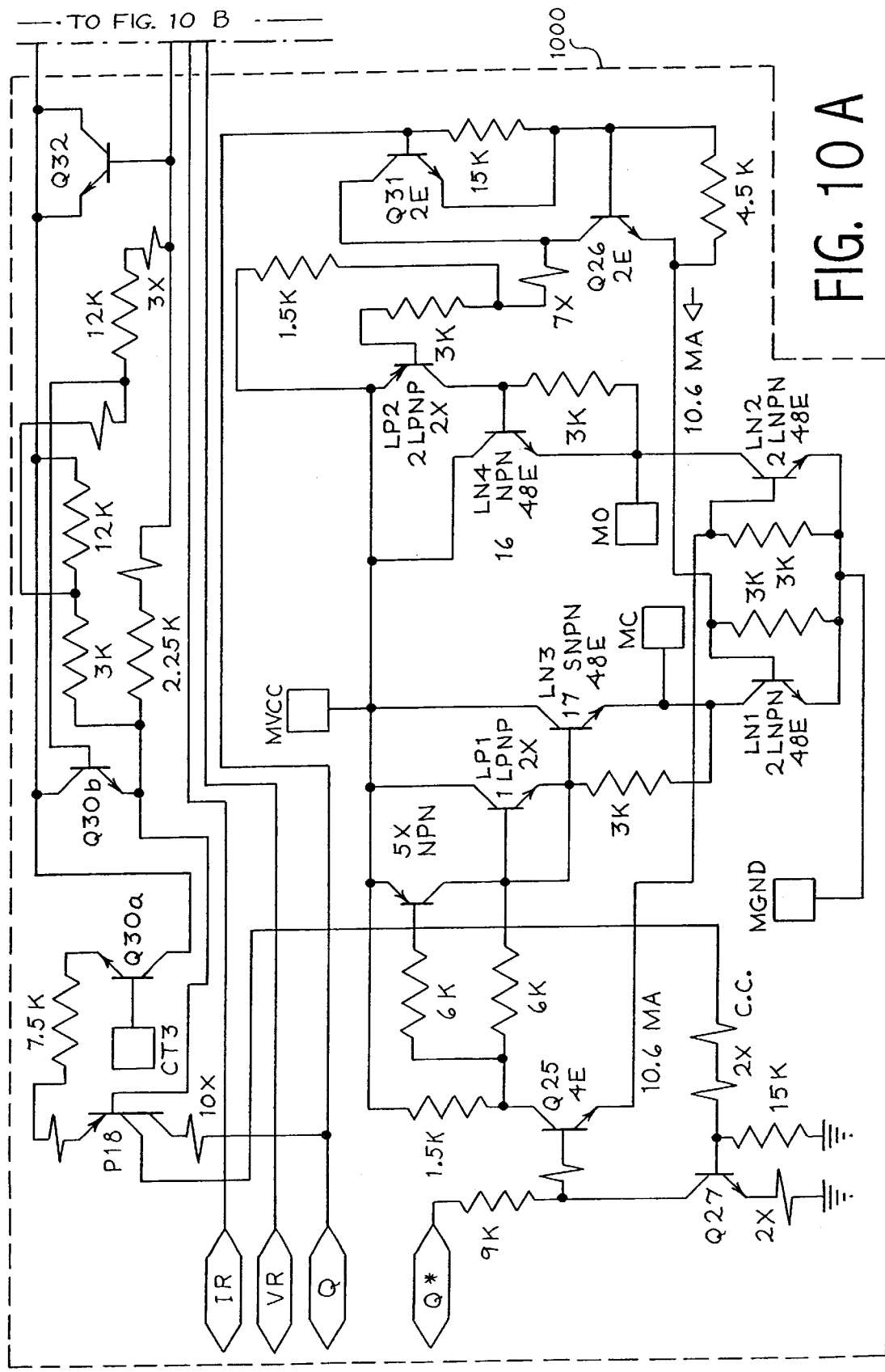
Figure 10B:
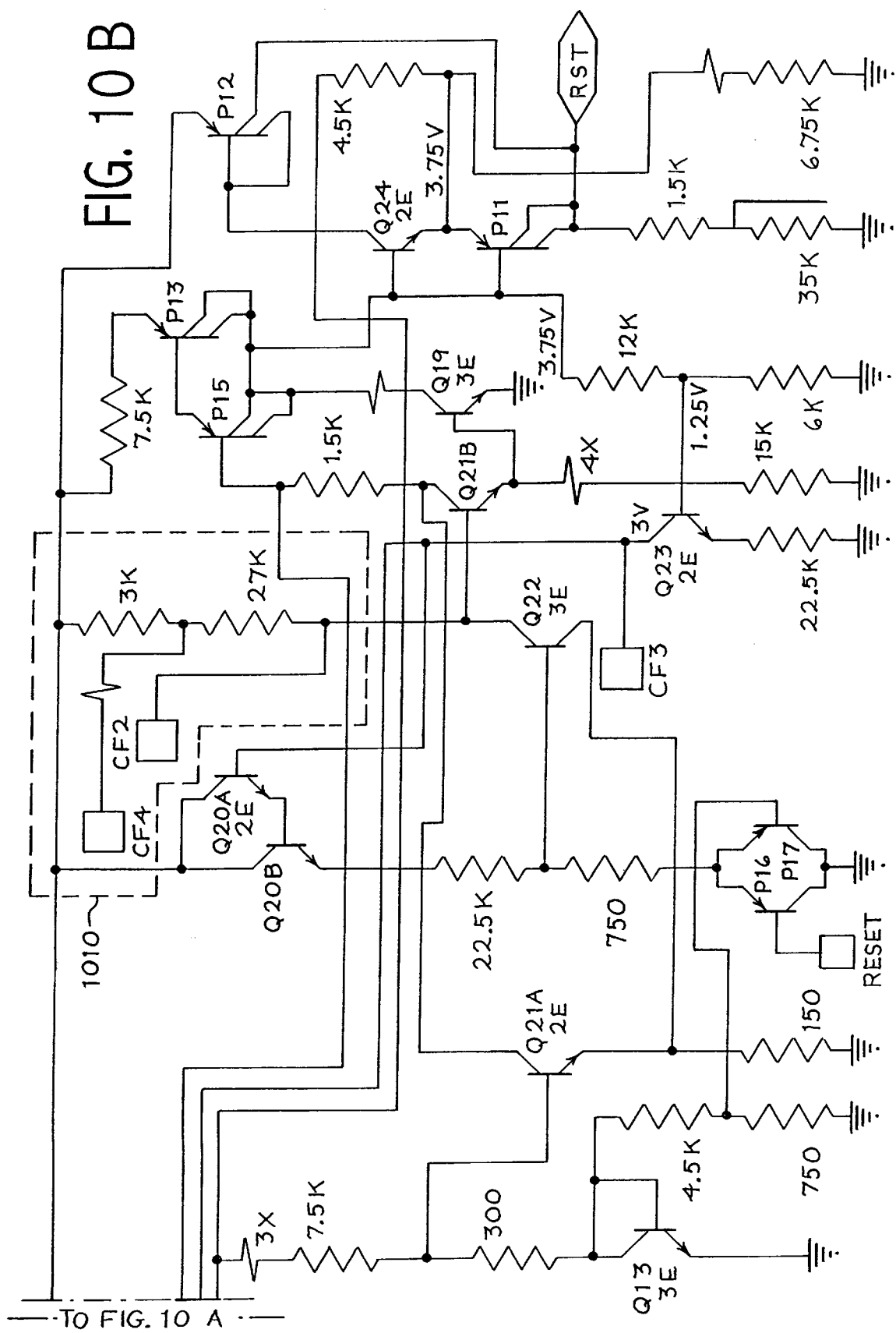

FIGS. 8, 9A, 9B, 10A and 10B illustrate one type of operating design. FIG. 8 shows an example of a preferred circuit design for generating motor open (MO) and motor close (MC) signals. An ASIC in this design preferably has a test point (TP) voltage of about 6.12 volts and is shown in FIGS. 9A, 9B, 10A and 10B. The overdrive circuit is shown in FIG. 10A by the components in box 1000. The components in box 1010 in FIG. 10B are preferably used to protect the system from transients. Using the specific components listed below, box 1010 acts as two high pass filters with cutoff frequencies of 53 Hz. Additionally, box 1010 may be useful, for example, in cars having a motor-driven fan that operates after the engine is turned off to cool the engine. Such a motor-driven fan may cause an engine running signal. The high pass filters of box 1010 may be useful in eliminating such false signals.

Table 2 below includes a list of suitable components for some of the elements described above:

TABLE 2

| Reference Number | Preferred Component | Description |
| --- | --- | --- |
| CT1 | TAN 15/25EDTM(A) | DIPPED TANTALUM 15 mfd 25 v |
| CT2 | TAN 4X7/16EDTK(A) | DIPPED TANTALUM 4.7 mfd 16 v |
| CT3 | LYT 63RE10 | RADIAL ELECTROLYTIC 10 mfd 63 v |
| CF1 | MYL BFX1MF/63/J | R68104J63B 0.1 mfd |
| CF2 | MYL BFX1MF/63/J | R68104J63B 0.1 mfd |
| CF3 | LYT 63RE10 | RADIAL ELECTROLYTIC 10 mfd 63 v |
| CF4 | LYT 100RE1 | RADIAL ELECTROLYTIC 1 mfd 100 v |
| CF5 | LYT 35RE100 | RADIAL ELECTROLYTIC 100 mfd 36 v |
| R1 | RCE 820-EJT | RCF 820 OHM 1/8W 5% T/R |
| R2 | RCE 2X4K-EJT | RCF 2.4K OHM 1/8W 5% T/R |
| R3 | POT PT6KV(5) 500 | PT6 400 OHM "V" CARBON POT |
| R4 | RCE 47K-EJT | RCF 47K OHM 1/8W 5% T/R |
| R5 | RCE 1M-EJT | RCF 1MEG OHM 1/8W 5% T/R |
| R6 | RDE2X2K-EJT | RCF 2.2K OHM 1/8W 5% T/R |
| R7 | RCE 1K-EJT | RCF 1K OHM 1/8W 5% T/R |
| R8 | RCQ 390-EJT | RCF 390 OHM 1/4W 5% T/R |
| R9 | RCE 75K-EJT | RCF 75K OHM 1/8W 5% T/R |
| D1 | DIO 1N5817T | DIODE 1N5817T DO41 1A 20 v |
| D2 | DIO 1N914T | DIODE IN914T |
| Z1 | DIO 1N5234B-T | DIODE 1N5234B DO35 X5W 6X2 |
| Z2 | DIO 1N4746A-T | DIODE IN4746A DO41 1W 18 v |

It is important to note that FIGS. 8, 9A, 9B, 10A and 10B show merely one particular design and that other designs can be used.

In FIGS. 6A, 6B, and 6C, a preferred embodiment of a housing 600 for the motor driven switch system 610 is shown. In the preferred embodiment, the housing 600 is employed to couple the motor driven switch system 610 to the automotive electrical system. As illustrated in FIG. 6A, the motor 624 drives compound gears 630 coupled to a threaded shaft 620. The contact plates 614a, 614b are also shown in FIG. 6A. As best seen in FIGS. 6B and 6C, the lower end of threaded shaft 620 is received in a threaded nut 625. The threaded nut 625 cooperates with threaded shaft 620 to cause axial movement to threaded shaft 620.

A threaded receptacle 602 shown in FIG. 6A connects to contact plates 614a and 614b, which are also shown in FIGS. 6B and 6C. The threaded receptacle 602 facilitates connection of the motor driven switch system 610 to the electrical system of the automobile. In the preferred housing shown in FIGS. 6A, 6B, and 6C, a battery terminal lug nut 608 is connected to the contact plate 614a, as shown in FIG. 6B. The lug nut 608 includes a threaded end 618 which mates with the threaded receptacle 602 provided in the housing 600. As those skilled in the art will appreciate, a hexagonal flange is provided on the lug nut 608 to enable its attachment to and removal from the housing 600.

As shown in detail in FIG. 6B, when the contact switch plate 628 is not in physical connection with the contact plates 614a, 614b, a small air gap appears. The air gap is present, therefore, when the switch 18 in FIG. 1 is in the open position. As shown in FIG. 6C, when the motor 624 drives the compound gears 630, the threaded shaft 620 moves the contact switch plate 628 in physical and electrical connection with the contact plates 614a, 614b, and the air gap closes. Thus, as the threaded shaft 620 is displaced horizontally by the compound gears 630, the contact switch plate 628 makes or breaks electrical connection with the contact plates 614a, 614b.

To withstand the forces between the switch contacts generated by the overdrive circuit, which in the preferred embodiment range from about 60 lbs to about 100 lbs, it is preferred that the housing 600 be constructed with a polypropylene and 30% glass composition and have a ribbed structure. Such a preferred housing, as well as the preferred gears and jack screw described above, can be obtained from Nevada Tool and Die.

The separate high current electrical system controlled by switch 18 may be an alternating current circuit, as well as a direct current circuit. The separate high current electrical system also may be a multiphase current circuit, such as a three-phase circuit. In the latter case, however, there would need to be an additional contact plate, and the movable plate 628 would need to be divided into segments, configurations that would be obvious to persons skilled in the field.

From the foregoing, operation of the improved motor driven switch should be apparent. Referring to FIG. 1, when the command circuit 11 receives a command to close the switch 18, a signal is generated by the control circuit 12 to rotate the reversible motor 14 in a first direction to close switch 18. When the motor turns in a first direction, it drives a gear train 14 which provides a mechanical advantage in forcing switch plate 28 against switch contacts 24a, 24b. The gear train drives a jackscrew mounted in a threaded stationary member 21. When the switch plate 28 first makes contact with the switch contacts 24a, 24b, the electrical resistance across the switch 18 in this first closed position is typically in excess of 10 milli-ohms. The high electrical resistance across the switch 18 in the first closed position reduces the current being applied to the starter 360, preventing the starter 360 from obtaining the cranking speed and cranking torque necessary to start the engine.

To reduce electrical resistance across the switch 18, the overdrive circuit 13 causes the motor 14 to further drive the gear train 16 to assert a greater force between the switch plate 28 and the contact plates 24a, 24b for a time established by an RC time constant of the overdrive circuit 13. Preferably, this time is in the range of about 0.6 seconds to about 0.9 seconds and is most preferably about 0.75 seconds. The electrical resistance across the switch 18 in this second closed position is reduced to less than said first electrical resistance (typically in excess of 10 milli-ohms). In the second closed position, the electrical resistance across the switch 18 is preferably below 8 milli-ohms, especially preferably below 5 milli-ohms, and most desirably below 2 milli-ohms. The benefit of lower electrical resistance across the switch 18, as explained above, is that more voltage and current are applied to the starter 360, thereby allowing the starter 360 to achieve the necessary cranking speed and cranking torque to start the engine.

When the command circuit 11 receives a command to open the switch 18, a signal is generated by the control circuit 12 to rotate the reversible motor 14 in a second direction to open switch 18. When the motor turns in a second direction, it drives a gear train 14 which provides a mechanical advantage in forcing switch plate 28 apart from switch contacts 24a, 24b in a first open position. In the first open position, the switch 18 is at risk of inadvertently closing due to mechanical vibration. To reduce this risk, the overdrive circuit 13 causes the motor 14 to further drive the gear train 16 to move switch plate 28 further away from switch contacts 24a, 24b to a second open position.

It will be noted that in switch closed position, the gear train and the jack screw provide a reverse mechanical advantage to the switch contacts whereby they are effectively locked in the switch closed position. In switch open position, the gear train and jack screw effectively lock the switch contacts in switch open position.

It is to be understood that a wide range of changes and modifications to the embodiments described above will be apparent to those skilled in the art, and are contemplated. It is therefore intended that the foregoing detailed description be regarded as illustrative rather than limiting, and that it be understood that it is the following claims, including all equivalents, that are intended to define the spirit and scope of this invention.

What is claimed is:

1. An electrical switching system, comprising:

at least one pair of switch contacts, at least one of which is relatively moveable toward and away from at least one opposing stationary switch contact between switch closed and switch open positions;

said moveable and stationary switch contacts in switch closed position having a first electrically closed position with a first electrical resistance and a second electrically closed position with a second electrical resistance less than said first electrical resistance; and an electro-mechanical device comprising an overdrive circuit and a drive mechanism constructed and arranged to drive said at least one moveable switch contact against said at least one stationary switch contact for a time after said first electrically closed position to reach said second electrically closed position;

said drive mechanism further constructed and arranged to withstand the forces developed when driving said at least one moveable switch contact against said at least one stationary switch contact;

said first electrically closed position being a position of said at least one movable switch contact and said at least one stationary switch contact when electrical contact is first made between said at least one movable switch contact and said at least one stationary switch contact;

said second electrically closed position being a position of said at least one movable switch contact and said at least one stationary switch contact when said at least one movable switch contact is driven against said at least one stationary switch contact for said time after said first electrically closed position is reached.

2. The electrical switching system of claim 1, wherein said first electrical resistance is greater than about 10 milli-ohms.

3. The electrical switching system of claim 1, wherein said second electrical resistance is less than about 8 milli-ohms.

4. The electrical switching system of claim 1, wherein said second electrical resistance is less than about 5 milli-ohms.

5. The electrical switching system of claim 1, wherein said second electrical resistance is less than about 2 milli-ohms.

6. The electrical switching system of claim 1, wherein said time is greater than about 0.6 seconds.

7. The electrical switching system of claim 1, wherein said time is greater than about 0.75 seconds.

8. The electrical switching system of claim 1, wherein said time is greater than about 0.9 seconds.

9. The electrical switching system of claim 1, wherein said drive mechanism comprises a jack screw and at least one gear, wherein said jack screw is attached to one of said at least one gear by a fillet radius.

10. A method for reducing the electrical resistance across at least one pair of switch contacts in a switch closed position, said at least one pair comprising at least one movable switch contact and at least one opposing stationary switch contact using an electro-mechanical system comprising an overdrive circuit and a drive mechanism for opening and closing said switch contacts, said drive mechanism constructed and arranged to withstand the forces developed when driving said at least one moveable switch contact against said at least one stationary switch contact, the steps comprising:

(a) moving at least one movable switch contact relatively toward at least one opposing stationary switch contact to a first electrically closed position having a first electrical resistance, and then (b) further moving said at least one movable switch contact against said at least one stationary switch contact for a time after said first electrically closed position to reach a second electrically closed position having a second electrical resistance less than said first electrical resistance.

11. The method of claim 10, wherein said first electrical resistance is greater than about 10 milli-ohms.

12. The method of claim 10, wherein said second electrical resistance is less than about 8 milli-ohms.

13. The method of claim 10, wherein said second electrical resistance is less than about 5 milli-ohms.

14. The method of claim 10, wherein said second electrical resistance is less than about 2 milli-ohms.

15. The method of claim 10, wherein said time is greater than about 0.6 seconds.

16. The method of claim 10, wherein said time is greater than about 0.75 seconds.

17. The method of claim 10, wherein said time is greater than about 0.9 seconds.

18. A switching system, comprising:

at least one pair of contacts, wherein at least one contact of said at least one pair of contacts is movable relatively toward and away from the other contact between switch open and switch closed positions; and an electro-mechanical system including an overdrive circuit;

said at least one moveable contact of said at least one pair of contacts driven by said electro-mechanical system;

said at least one pair of contacts in switch closed position having an electrical resistance less than about 8 milli-ohms.

19. The switching system of claim 18 in which the electrical resistance across said at least one pair of contacts in switch closed position is less than about 5 milli-ohms.

20. The switching system of claim 18 in which the electrical resistance across said at least one pair of contacts in switch closed position is less than about 2 milli-ohms.

21. In a system for controlling a motor driven switch comprising at least one pair of contacts, said at least one pair of contacts comprising at least one contact movable relatively toward and away from at least one other contact between switch open and switch closed positions, command circuit means responsive to a first condition for generating a first signal and responsive to a second condition for generating a second signal, and control circuit means responsive to said first signal for moving said at least one contact in a switch open position and responsive to said second signal for moving said at least one contact in a switch closed position, the improvement comprising:

an overdrive circuit to move said at least one pair of contacts in switch closed position relatively toward each other to an electrical resistance less than about 8 milli-ohms.

22. The system of claim 21, wherein said electrical resistance across said at least one pair of contacts in switch closed position is less than about 5 milli-ohms.

23. The system of claim 21, wherein said electrical resistance across said at least one pair of contacts in switch closed position is less than about 2 milli-ohms.

24. An electrically-operated switching system, comprising:

at least one pair of contacts, wherein at least one contact of said at least one pair of contacts is movable relatively toward and away from the other contact between switch open and switch closed positions;

a command circuit which in response to a first condition generates a first signal and which in response to a second condition generates a second signal;

a control circuit responsive to said first signal to activate an electromechanical system to move said at least one pair of contacts relatively toward the other contact to a switch closed position and responsive to said second signal to activate the electromechanical system to move said at least one pair of contacts relatively away from the other contact to a switch open position; and an overdrive circuit responsive to said first signal to activate the electromechanical system to move said at least one pair of contacts in switch closed position relatively toward the other to an electrical resistance of less than about 8 milli-ohms.

25. The electrically-operated switching system of claim 24, wherein said overdrive circuit reduces the electrical resistance across said at least one pair of contacts in switch closed position to less than about 5 milli-ohms.

26. The electrically-operated switching system of claim 24, wherein said overdrive circuit reduces the electrical resistance across said at least one pair of contacts in switch closed position to less than about 2 milli-ohms.

27. A motor driven switching system, comprising:
a reversible motor;
a circuit including an overdrive for operating said motor;
a gear train driven by said motor;
a drive mechanism driven by said gear train including a jack screw rotatable in a stationary threaded member;
at least one pair of switch contacts;
at least one switch contact of said at least one pair of switch contacts moveable by said jack screw between switch open and switch closed positions;
said drive mechanism constructed and arranged to withstand the forces developed when driving said at least one moveable switch contact; and
said at least one pair of said switch contacts in switch closed position having an electrical resistance less than about 8 milli-ohms.

28. The motor driven switching system of claim 27 in which the electrical resistance across said at least one pair of switch contacts is less than about 5 milli-ohms.

29. The motor driven switching system of claim 27 in which the electrical resistance across said at least one pair of switch contacts is less than about 2 milli-ohms.

30. An electrical motor driven switching system, comprising:
a reversible electrical motor;
an electrical circuit including an overdrive for operating the electrical motor;
a gear train driven by the electrical motor;
a drive mechanism driven by the gear train including a jack screw rotatable in a stationary threaded member;
at least one pair of electrical switch contacts; and
at least one electrical switch contact of the at least one pair of electrical switch contacts moveable by the jack screw between switch open and switch closed positions;
the at least one pair of the electrical switch contacts in switch closed position having an electrical resistance less than about 8 milli-ohms.

31. The electrical motor driven switching system of claim 30 in which the electrical resistance across the at least one pair of electrical switch contacts is less than about 5 milli-ohms.

32. The electrical motor driven switching system of claim 30 in which the electrical resistance across the at least one pair of electrical switch contacts is less than about 2 milli-ohms.

33. An electrical switching system, comprising:
at least one pair of electrical switch contacts, at least one of which is relatively moveable toward and away from at least one opposing stationary electrical switch contact between switch closed and switch open positions;
the moveable and stationary electrical switch contacts in switch closed position having a first electrically closed position with a first electrical resistance and a second electrically closed position with a second electrical resistance less than the first electrical resistance; and
an electro-mechanical device comprising an overdrive circuit and a drive mechanism constructed and arranged to drive the at least one moveable electrical switch contact against the at least one stationary electrical switch contact for a time after the first electrically closed position to reach the second electrically closed position;
the first electrically closed position being a position of the at least one movable electrical switch contact and the at least one stationary electrical switch contact when electrical contact is first made between the at least one movable electrical switch contact and the at least one stationary electrical switch contact;
the second electrically closed position being a position of the at least one movable electrical switch contact and the at least one stationary electrical switch contact when the at least one movable electrical switch contact is driven against the at least one stationary electrical switch contact for the time after the first electrically closed position is reached.

34. The electrical switching system of claim 33, wherein the time is greater than about 0.6 seconds.

35. The electrical switching system of claim 33, wherein the time is greater than about 0.75 seconds.

36. The electrical switching system of claim 33, wherein the time is greater than about 0.9 seconds.

37. The electrical switching system of claim 33, wherein the first electrical resistance is greater than about 10 milli-ohms.

38. The electrical switching system of claim 33, wherein the second electrical resistance is less than about 8 milli-ohms.

39. The electrical switching system of claim 33, wherein the second electrical resistance is less than about 5 milli-ohms.

40. The electrical switching system of claim 33, wherein the second electrical resistance is less than about 2 milli-ohms.

41. A method for reducing electrical resistance across at least one pair of electrical switch contacts in a switch closed position, the at least one pair comprising at least one movable electrical switch contact and at least one opposing stationary electrical switch contact using an electro-mechanical system comprising an overdrive circuit and a drive mechanism for opening and closing the electrical switch contacts, the method comprising:
(a) moving at least one movable electrical switch contact relatively toward at least one opposing stationary electrical switch contact to a first electrically closed position having a first electrical resistance; and then
(b) further moving the at least one movable electrical switch contact against the at least one stationary electrical switch contact for a time after the first electrically closed position to reach a second electrically closed position having a second electrical resistance less than the first electrical resistance.

42. The method of claim 41, wherein the time is greater than about 0.6 seconds.

43. The method of claim 41, wherein the time is greater than about 0.75 seconds.

44. The method of claim 41, wherein the time is greater than about 0.9 seconds.

45. The method of claim 41, wherein the first electrical resistance is greater than about 10 milli-ohms.

46. The method of claim 41, wherein the second electrical resistance is less than about 8 milli-ohms.

47. The method of claim 41, wherein the second electrical resistance is less than about 5 milli-ohms.

48. The method of claim 41, wherein the second electrical resistance is less than about 2 milli-ohms.

* * * * *